May 22, 1923.
R. D. WYCKOFF
EXHIBITING DEVICE
Filed May 16, 1919
1,456,086
3 Sheets-Sheet 1
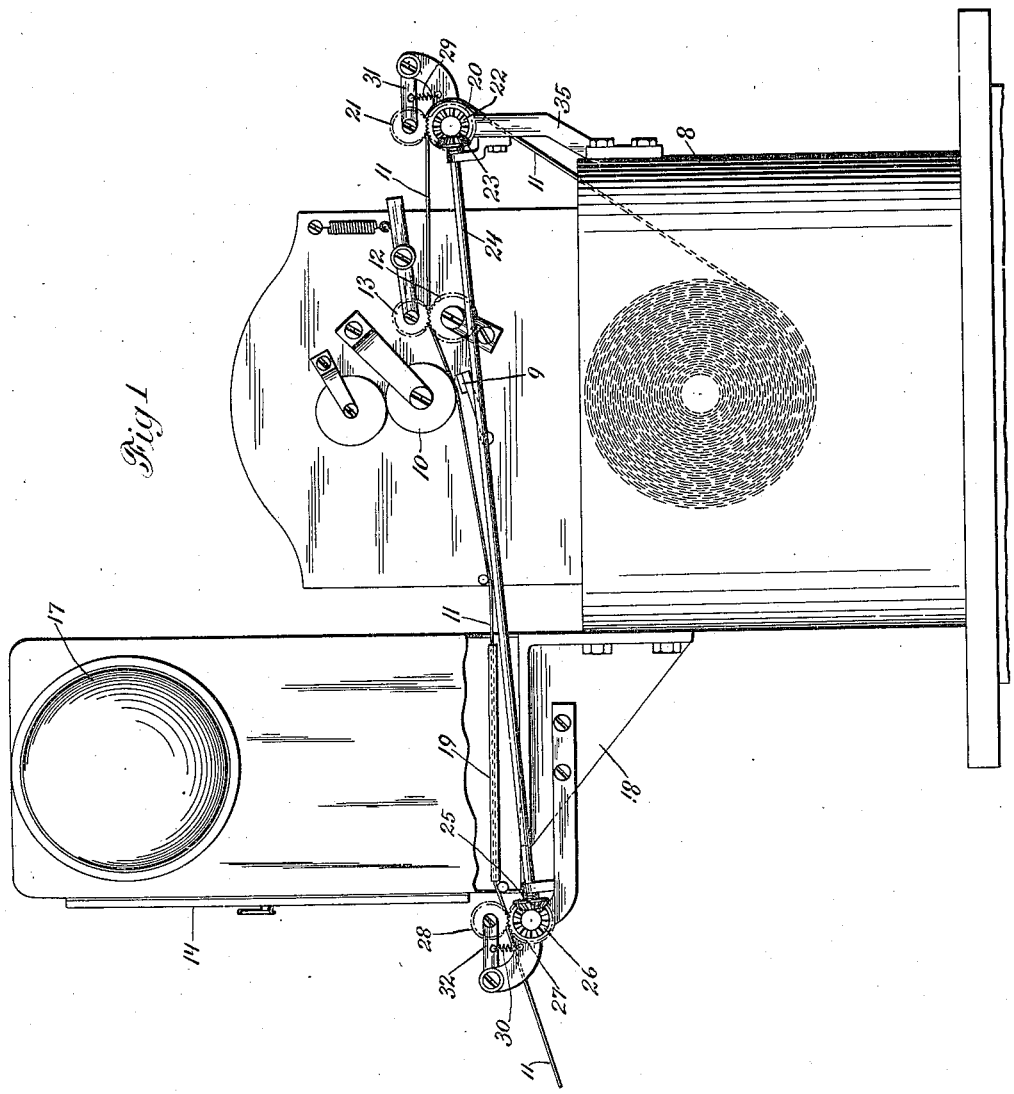
INVENTOR
Richard D. Wyckoff
BY
Frank J. Kent
ATTORNEY May 22, 1923.
R. D. WYCKOFF
EXHIBITING DEVICE
Filed May 16, 1919
1,456,086
3 Sheets-Sheet 2
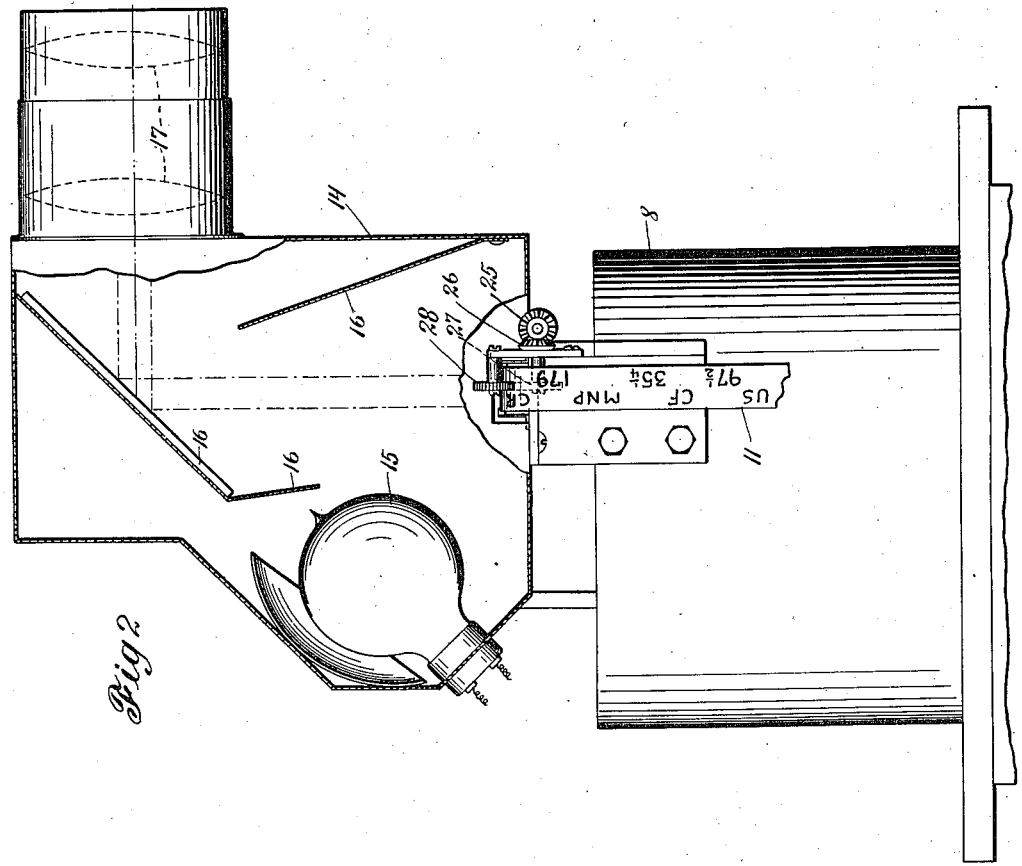
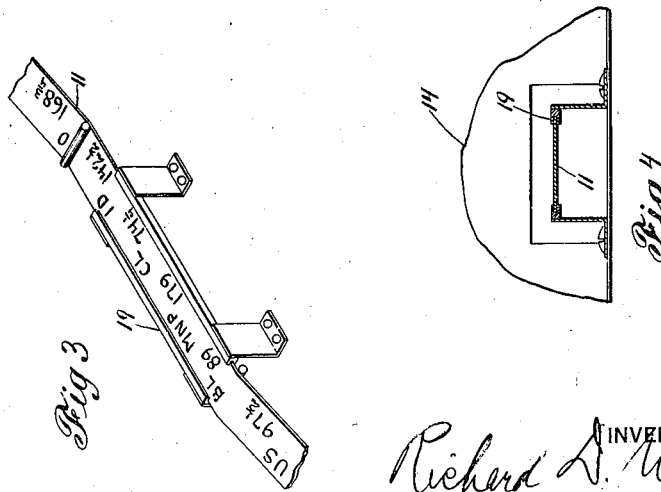
INVENTOR
Richard D. Wyckoff
BY
Frank J. Kent
ATTORNEY May 22, 1923.

R. D. WYCKOFF

EXHIBITING DEVICE

Filed May 16, 1919  3 Sheets-Sheet 3

1,456,086

INVENTOR
Richard D. Wyckoff
BY
Frank J. Kent
ATTORNEY

Patented May 22, 1923.

1,456,086

UNITED STATES PATENT OFFICE.

RICHARD D. WYCKOFF, OF NEW YORK, N. Y.

EXHIBITING DEVICE.

Application filed May 16, 1919. Serial No. 297,541.

*To all whom it may concern:*

Be it known that I, RICHARD D. WYCKOFF, a citizen of the United States, residing at New York, in the county of New York and State of New York, have invented certain new and useful Improvements in Exhibiting Devices, of which the following is a specification.

The objects of my invention are to provide mechanism for publishing or exhibiting to an audience reports such as furnished by a "news" or "stock ticker" and to provide this apparatus in simple and inexpensive form, readily attachable to a "ticker" of the character now in general use.

Stated generally, the invention consists of a projector which is combined with the printing mechanism of the ticker or other instrument in such a way as to project a "picture" of the record, as it is made, onto a screen where it can be easily read by those interested.

In the accompanying drawings I have illustrated several preferred embodiments of such apparatus, but would have it understood that my invention is not limited to these particular forms.

Figure 5:
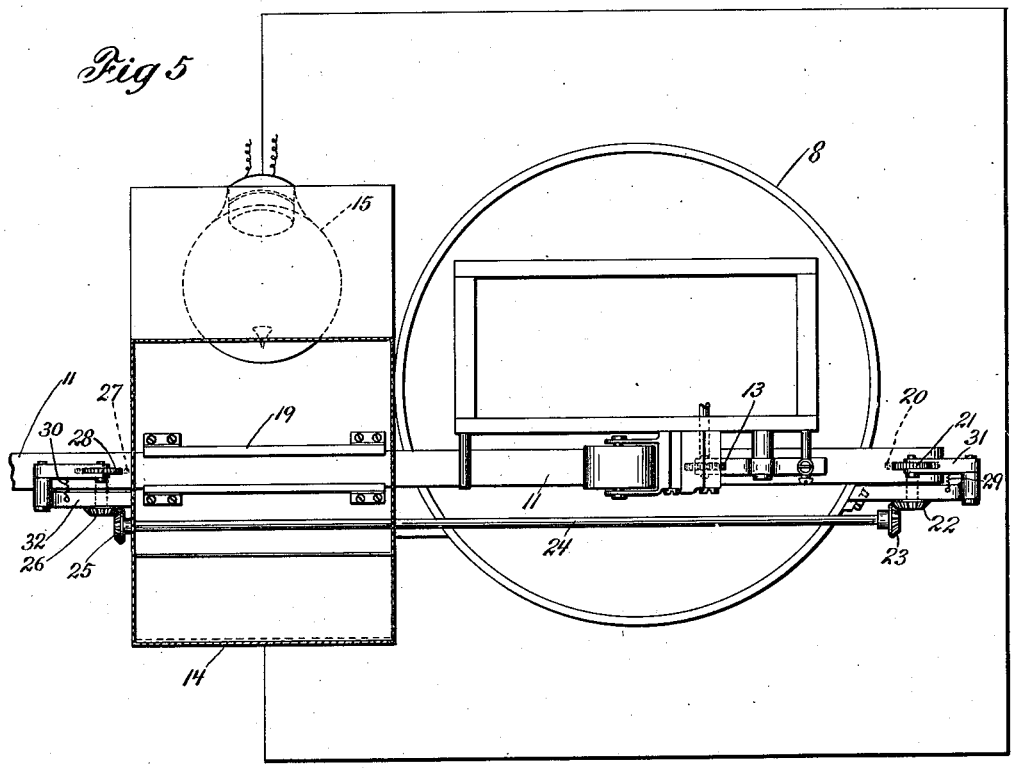
Figure 6:
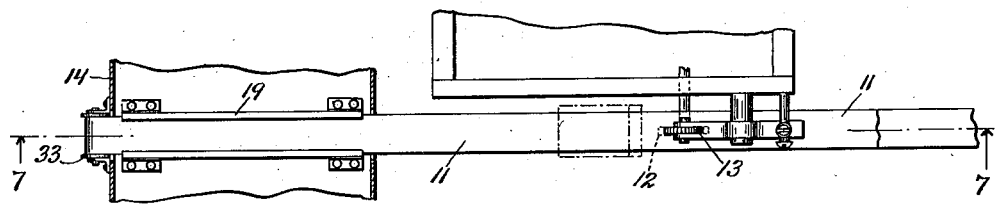
Figure 7:
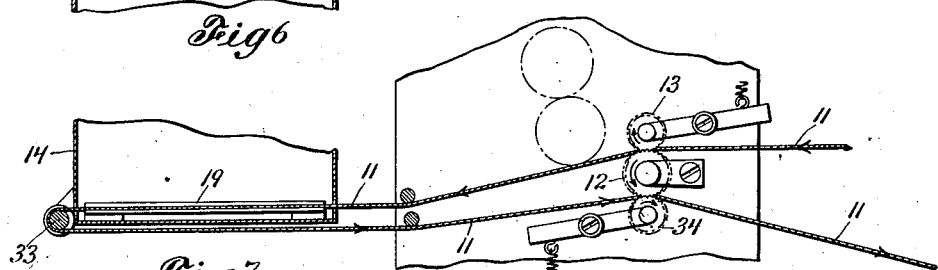

In these drawings, Figure 1 is a front view of the combined record printing and projecting apparatus; Figure 2 is a side view of the same, with the projector shown in section; Figure 3 is a detached detail view of the strip or "tape" guide; Figure 4 is a cross sectional view thereof as in the machine; Figure 5 is a plan and part-sectional view of the machine; Figures 6 and 7 are broken plan and vertical sectional views of a modified form of apparatus.

In the present disclosure, the record is furnished by a "ticker" 8, the same being indicated as of conventional design and provided with printing mechanism in the form of cooperating impression producing members 9 and 10, between which the record tape 11 is fed by power driven feed rollers 12, 13.

14 designates the projector, shown more fully in Figure 2, as consisting of a casing containing a suitable light 15, reflectors 16 and projecting lenses 17. This projector is supported adjacent the printing mechanism, in the present disclosure, on a bracket 18, which is readily attachable to the ticker, and it is provided with a guide 19, receiving the tape directly from the printing mechanism and supporting the same in position to be projected onto a suitable screen.

The tape is automatically fed through the projector in the present disclosure, either directly or indirectly by the feeding means of the ticker. In Figure 1 this is accomplished by providing two additional rollers 20, 21, between which the tape is drawn by the feed rollers 12, 13 and from one of which (20) power is taken, by means of bevel gears 22, 23, shaft 24, and bevel gears 25, 26, to drive a pair of drawing-out rollers 27, 28, located at the far side of the projector. Rollers 20, 21 and 27, 28 are caused to grip the tape with sufficient tension as by means of springs 29, 30, operating on the pivoted levers 31, 32 which support the upper rollers, said construction enabling ready separation of the different pairs of rollers for the purpose of initially "threading" the tape through the machine.

In the form disclosed in Figures 6 and 7, the tape after being passed through the projector, is turned over a guide roller 33 and looped back into the ticker and between the lower face of the main feed roller 12 and a supplementary spring-pressed roller 34, cooperating therewith. Thus in this case the main feed rollers, with the assistance of the supplementary roller, feed a loop of the tape through both the ticker and the projector. The supplementary feed roller may be applied as an attachment to the ticker and similarly in Figure 1, the tape-driven rollers 20, 21 may be mounted on a bracket 35, readily attachable to the ticker. It will thus be seen that the entire apparatus may be readily applied as an attachment to the ordinary ticker.

It will be apparent from the foregoing that with my invention, as the record is printed, the same will be automatically flashed upon a screen where the stock transactions, news events or other items may be easily read and followed by an entire audience. The invention has the further advantage that it may readily be combined with an ordinary reporting machine and will operate entirely automatically in conjunction with that machine.

I claim:—

1. The combination with an automatic printing machine provided with strip feeding rollers, of a projector associated therewith and provided with a guideway for supporting the strip in projecting position and means operated by the strip feeding rollers for feeding the strip through said guideway, said means including drawing-out rollers for the strip located at the exit end of the guideway, a roller engaged by the strip and driven thereby and driving connections from said roller to the drawing-out rollers.

2. The combination with an automatic printing machine provided with strip feeding rollers, of a projector associated therewith and provided with a guideway for supporting the strip in projecting position, means operated by the strip feeding rollers for drawing the strip through the guideway, said means including a drawing out roll for the strip located at the exit end of the guideway, a roller engaged by the strip and driven thereby, a driving connection from said roller to the drawing out roll, and means for maintaining the strip in surface contact with the drawing out roll.

In testimony whereof I affix my signature.

RICHARD D. WYCKOFF.